United States Patent [19]
Verburg

[11] Patent Number: 5,644,863
[45] Date of Patent: Jul. 8, 1997

[54] FISHING GEAR FOR ELECTRIC FISHING

[76] Inventor: Abraham Leendert Verburg, Havenstraat 11, NL-4486 AA Colijnsplaat, Netherlands

[21] Appl. No.: 545,699
[22] PCT Filed: Apr. 21, 1994
[86] PCT No.: PCT/NL94/00086
 § 371 Date: Dec. 21, 1995
 § 102(e) Date: Dec. 21, 1995
[87] PCT Pub. No.: WO94/26101
 PCT Pub. Date: Nov. 24, 1994

[30] Foreign Application Priority Data

May 6, 1993 [NL] Netherlands ............... 9300773

[51] Int. Cl.$^6$ .................... A01K 73/02; A01K 79/02
[52] U.S. Cl. .................. 43/9.6; 43/9.4; 43/9.5; 43/17.1
[58] Field of Search ............... 43/17.1, 98, 9.4, 43/9.5, 9.6

[56] References Cited

U.S. PATENT DOCUMENTS

| | | | |
|---|---|---|---|
| 3,312,011 | 4/1967 | Wathne et al. | 43/17.1 |
| 3,415,001 | 12/1968 | Ott et al. | 43/17.1 |
| 3,683,280 | 8/1972 | Holt | 43/9.6 |
| 3,775,891 | 12/1973 | Holt | 43/9 |
| 3,777,388 | 12/1973 | Newman et al. | 43/9 |

FOREIGN PATENT DOCUMENTS

| | | | |
|---|---|---|---|
| 8104576 | 5/1983 | Netherlands . | |
| 8603257 | 7/1988 | Netherlands . | |
| 235507 | 1/1969 | U.S.S.R. | 43/9.6 |

*Primary Examiner*—Jeanne Elpel
*Attorney, Agent, or Firm*—Young & Thompson

[57] ABSTRACT

Fishing gear for electric fishing, comprising a beam (5) which is provided with pairs of electrodes (9, 10) over which a potential difference can be generated, as well as a power source (16) and pulse generator. The power source (16), the pulse generator and the connections of the electrodes (9, 10) are housed in a watertight chamber inside the beam (5), the pulse generator being housed in a chamber which for cooling purposes is partly flushed by water. The electrodes (9, 10) are also each provided with a core (42) of electrically conducting material, metal electrode pieces (43) being electrically connected to the core (42) with regular spacings between them and the core being insulated between the electrode pieces (43).

11 Claims, 7 Drawing Sheets

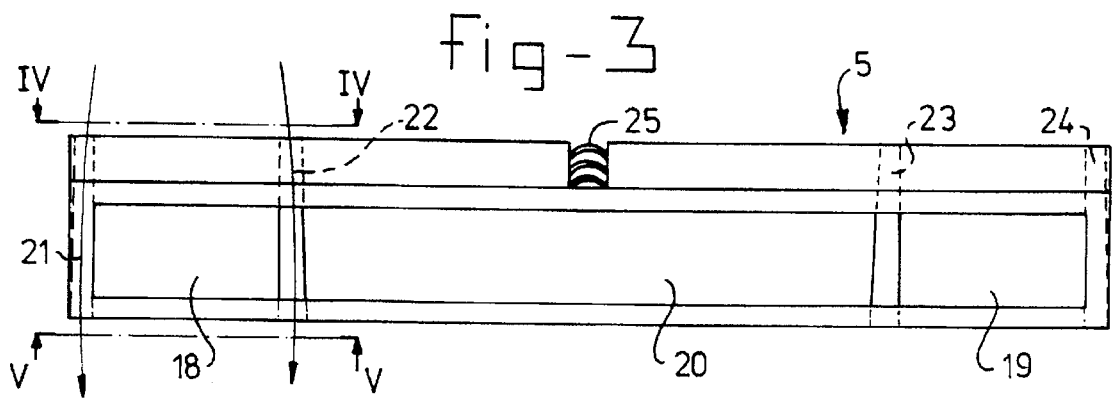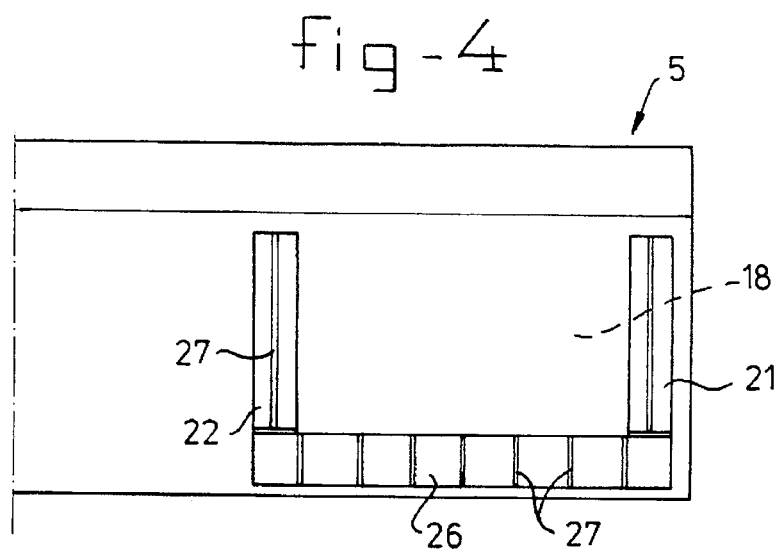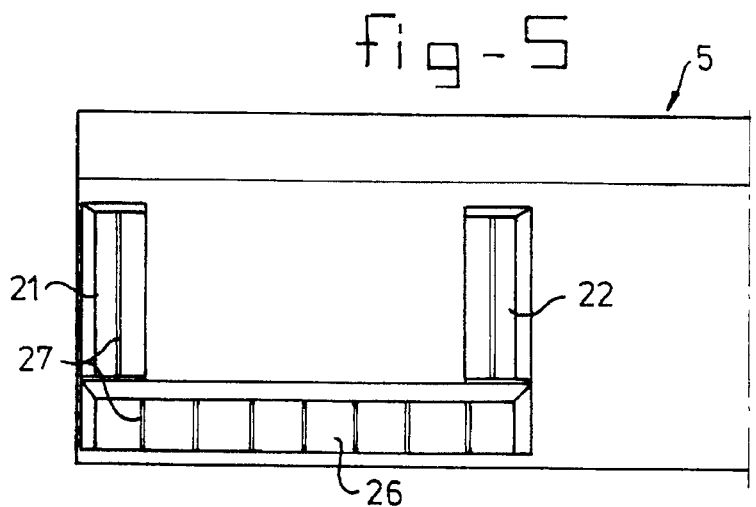

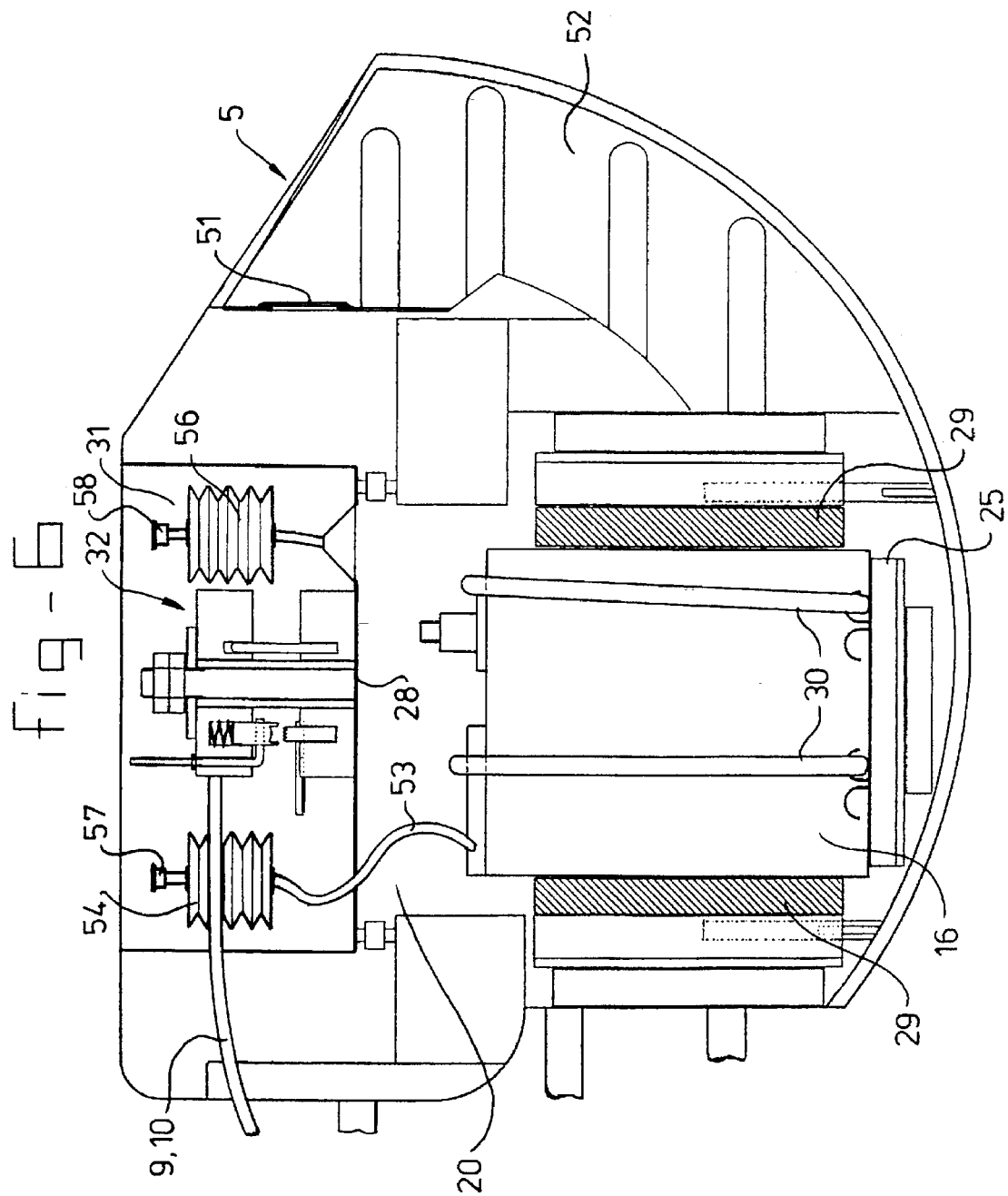

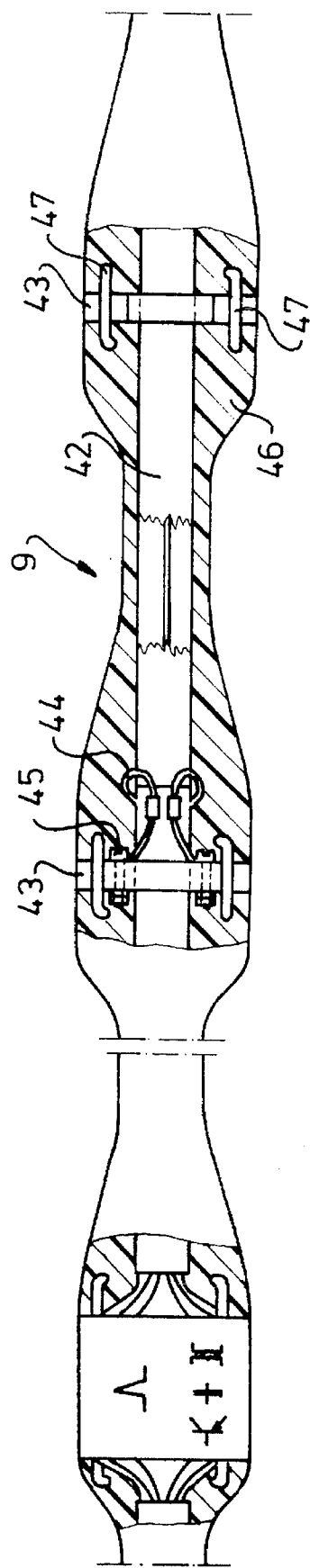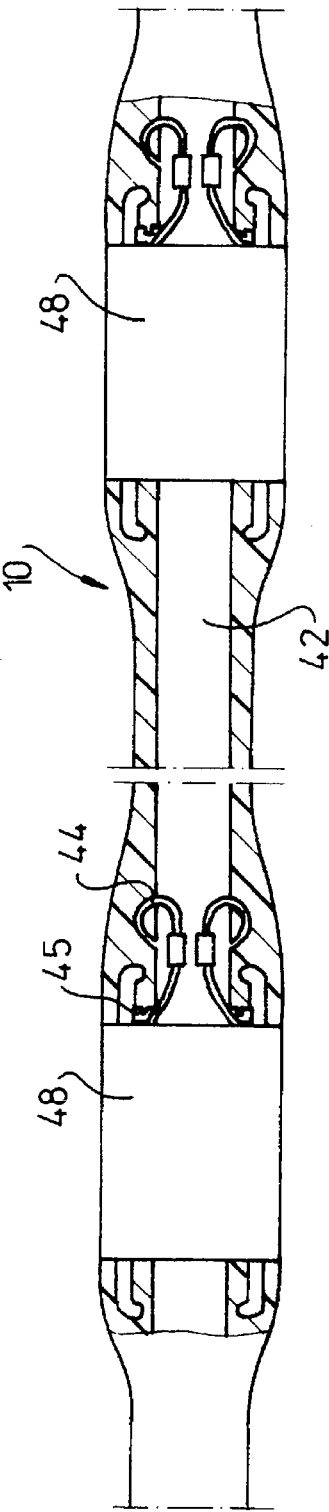

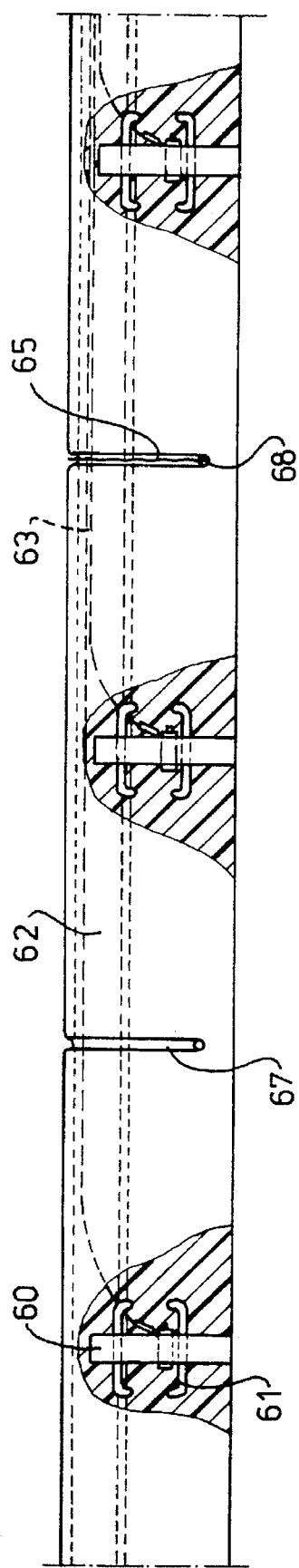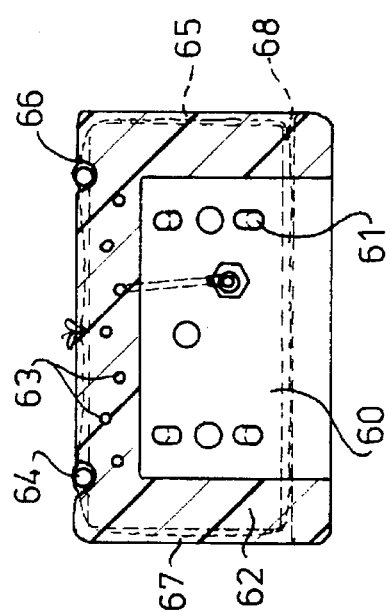

FISHING GEAR FOR ELECTRIC FISHING

The invention relates to fishing gear for electric fishing, comprising a beam which is provided with pairs of electrodes over which a potential difference can be generated, as well as a power source and pulse generator.

Fishing gear of this type is disclosed in Netherlands Patent Application NL-A-8603257, published Jul. 18, 1988. In the case of this known gear, the power source and voltage generator are housed in one or both box-shaped shoes which are attached to the ends of the beam. However, the space inside a shoe of this type is limited. Moreover, said shoes are also exposed to high stress, for instance when the beam is dragged over a bottom which is uneven. Consequently, it is not easy to guarantee the watertightness of the box and correct functioning of the power source and pulse generator.

The aim of the invention is, therefore, to provide fishing gear of the abovementioned type which both offers a larger space for carrying equipment and also affords better protection. This is achieved in that the power source, the pulse generator and the connections for the electrodes are housed in a watertight chamber inside the beam.

According to the invention the beam is constructed in the form of an elongated box in which there is sufficient room to accommodate all components of the electrical system. Said components are consequently better protected against moisture and knocks than when in the shoes or in separate chambers on the outside of the beam.

Preferably, the pulse generator is housed in a chamber which for cooling purposes is partly flushed by water. The heat which the pulse generator generates during operation can now be dissipated directly to the surrounding water, without the other components becoming overheated. Excellent cooling can be achieved if channels extend through the beam from front to back in the direction the beam is dragged and transverse to its longitudinal direction, which channels delimit the chamber for the pulse generator.

In connection with ease of accessibility of all components, the chamber in the beam is closed at the top by means of a lid.

The beam according to the invention has a larger frontal surface area than the known beam. In order nevertheless to obtain good beam characteristics when dragging over the sea bed, the beam is rounded on the side which is at the front in the direction of drag and has passages for the electrodes at the back.

The electrodes are attached at their ends distal to the beam to the bottom edge of a trawl-net. The top edge of the trawl-net is attached to the top of the beam in a known manner.

The electrodes are preferably constructed with a core of arbitrarily shaped, conductive material, to which core metal electrode pieces of the desired shape and dimensions are electrically connected with regular spacings between them, whilst the core between the electrode pieces is insulated. Concentrated current pulses, which deliver an excellent excitation pulse, can be emitted using electrodes constructed in this way.

If a rubber sleeve extends between the electrode pieces, the electrodes can be reliably dragged along without becoming caught up behind obstacles.

The invention will now be explained in more detail with reference to an illustrative embodiment shown in the figures.

FIG. 3 shows a top view of the beam.

FIG. 4 shows view IV—IV according to FIG. 3.

FIG. 5 shows view V—V according to FIG. 3.

FIG. 6 shows a cross-section through the beam on an enlarged scale.

FIG. 8 shows a partially cross-sectional view of an example of a streamlined, circular design of a positive electrode.

FIG. 9 shows a partially cross-sectional view of an example of a streamlined, circular design of a negative electrode.

FIG. 10 shows a partially cross-sectional view of an example of a flat design of a positive electrode.

FIG. 11 shows a partially cross-sectional view of an example of a flat design of a negative electrode.

Figure 1:
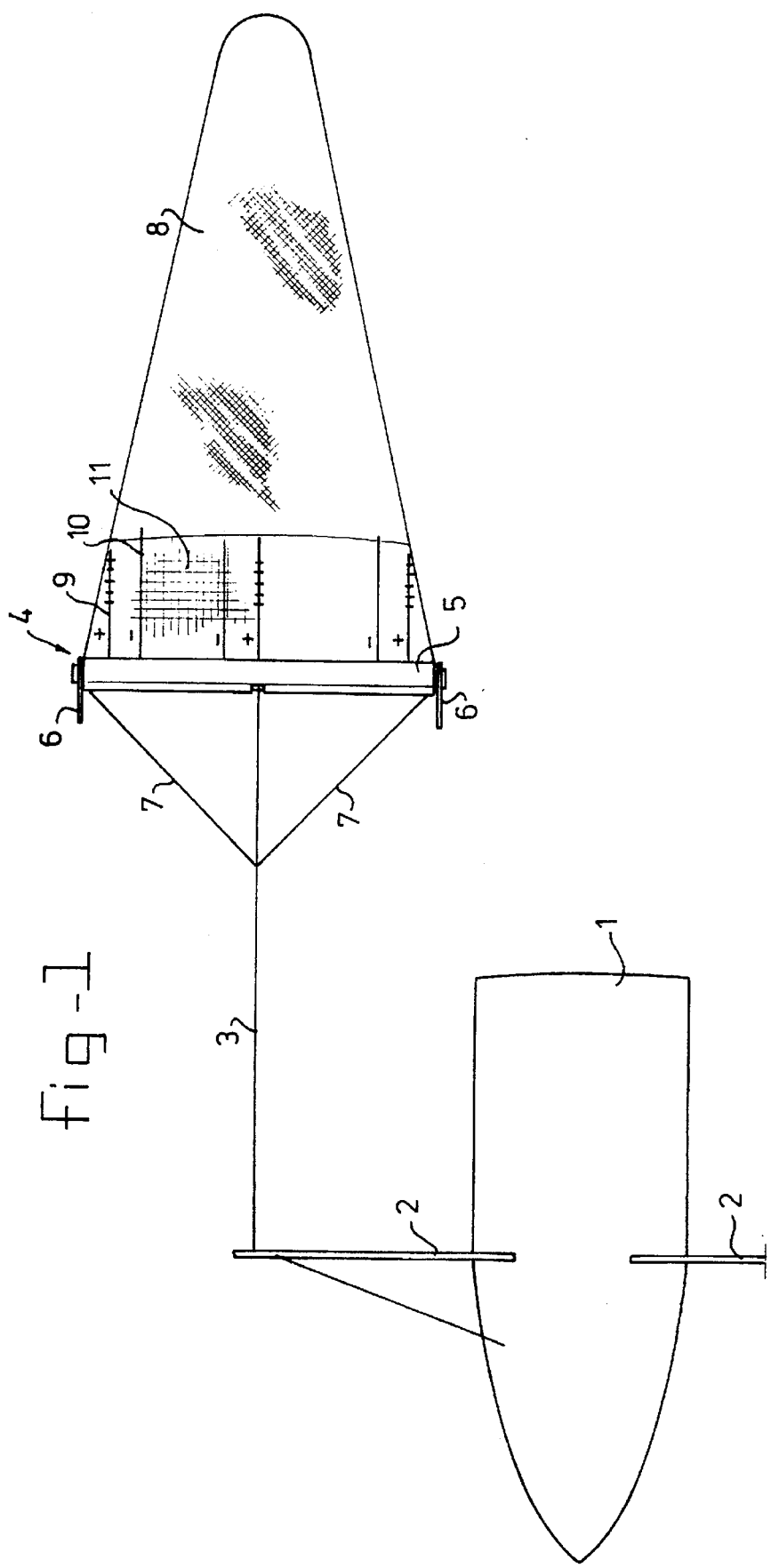
FIG. 1 shows a diagrammatic top view of a fishing vessel, in combination with the fishing gear according to the invention.

FIG. 1 shows a fishing vessel 1, which is provided with two booms 2, on which the fishing gear, which is indicated in its entirety by 4, is dragged by means of drag-line 3.

Said fishing gear 4 comprises a beam 5, which is provided at both ends with shoes 6. The drag cable 3 and stabilizer cables 7 are attached to that side of the beam which is at the front in the direction of drag.

A net 8 as well as positive electrodes 9 and negative electrodes 10 are fitted on that side of the beam 5 which is at the back seen in the direction of drag.

Figure 2:
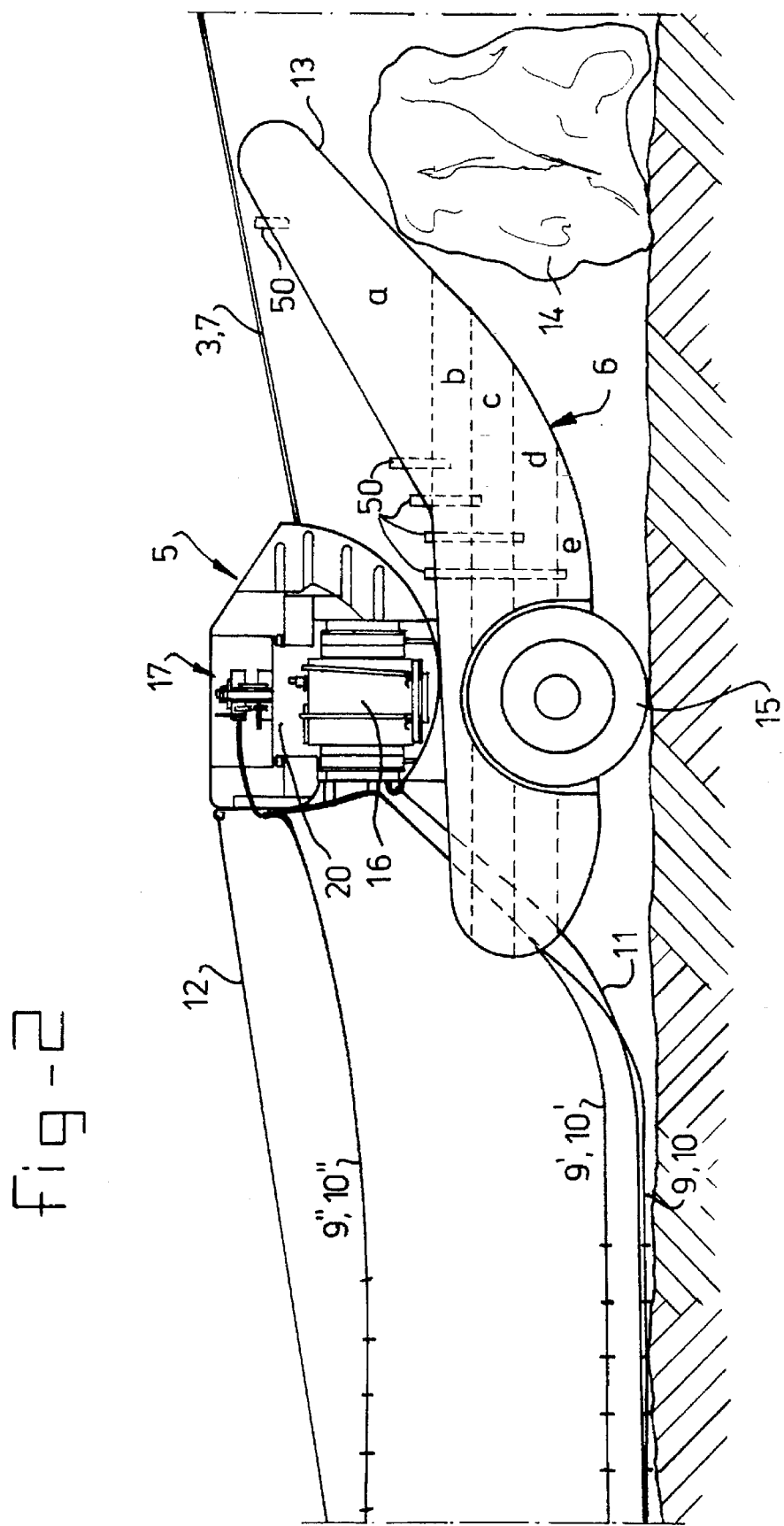
FIG. 2 shows a side view of part of the fishing gear.

As shown in the side view in FIG. 2, the electrodes are dragged over, in or at a certain height above the sea bed. Depending on the type of fish, said electrodes are beneath 9, 10, between, above 9', 10' or on the sides 9", 10" of a fairly coarse mesh net 11, which on one side is connected to the beam 5 and on the other side is connected to the lower edge of the net 8. The upper edge of the net 8 is also connected to the beam 5, by means of hauling cables 12.

As can clearly be seen in FIG. 2, the shoes 6 are constructed with an upwards-sloping front edge 13, such that said shoes can be pulled easily over obstacles 14. In order to protect the flora on the sea bed, the shoes 6 have wheels or rolling equipment 15, which allows the shoes 6 to ride over the sea bed as they are dragged. The compartments a-b-c-d-e are intended for filling with water for trimming the gear, via pipes 50.

FIG. 2 shows the beam 5 in cross-section. The power source 16 and the connection points for the electrodes 9, 10, which connection points are indicated in their entirety by 17, can be seen in the cross-section.

In the top view shown in FIG. 3, the beam 5 is shown without the lid. As a result, three chambers can be seen; these are chambers 18 and 19 and chamber 20. Chambers 18 and 19 are delimited by channels 21, 22 and 23, 24 respectively, which widen from the front of the beam 5, where the towing eyes 25 are located, to the back. As can be seen in the front view 4, the chamber 18 is also delimited by a channel 26. Channels 21, 22 and 26 are provided with bars 27, which prevent said channels 21, 22 and 26 from becoming blocked.

In the rear view shown in FIG. 5 it can be seen that the channels 21, 22 and 26 widen, said widening being towards the rear of the beam 5.

Components which become hot during operation, i.e. the pulse generators (which are not shown in more detail), are housed in the chambers 18, 19. The other components, in particular the power source, are housed in chamber 20. Said power source can be made up of one or more batteries 16. It would also be possible to use other power sources, such as, for example, a gas-generator.

In the enlarged cross-section shown in FIG. 6 it can be seen that the chamber 20 is sealed watertight at the top by a lid 28. The power source 16 is housed between rubber blocks 29 and held in place by means of elastic cables 30. Consequently, the batteries 16 are well-protected against shocks.

Above the chamber 20 there is a further watertight chamber 31, where the electrodes 9, 10 are electrically connected by means of the connection devices 32. Said connection devices have a power cable 33, which is also connected to the pulse generators, which are not shown.

Two systems, for venting and storage respectively, in which the gas liberated from the batteries can be stored, are also provided in the beam.

The first system is connected directly to the vent holes of the batteries and comprises a pipe 53 which at one end is connected to said holes and at the other end is connected to a storage chamber 54, which is in the form of bellows.

The second system is connected to the chamber 20 and comprises a storage chamber 56 in the form of bellows.

After the lid of chamber 31 has been opened, the gas which has collected in the bellows-shaped storage chambers 54 and 56 can be discharged by removing the closures 57, 58 and compressing the bellows 54, 56.

By means of these two systems both the batteries 16 themselves and the battery chamber 20 are protected against the risk of explosion which, if the liberated battery gases were to mix with the air in the beam, could arise should sparking occur in said beam as a consequence of, for example, poor electrical contacts.

As yet a further measure in this regard, the battery chamber 20 is also filled with nitrogen.

A rupture surface 51 has also been provided in the wall of chamber 20, which rupture surface gives way should an explosion nevertheless occur in said chamber 20. The resulting increase in pressure can then be absorbed in chamber 52. An important feature is that no water is able to penetrate chamber 20 even if rupture surface 51 gives way. The explosion also remains restricted to the space inside the beam.

Figure 7:
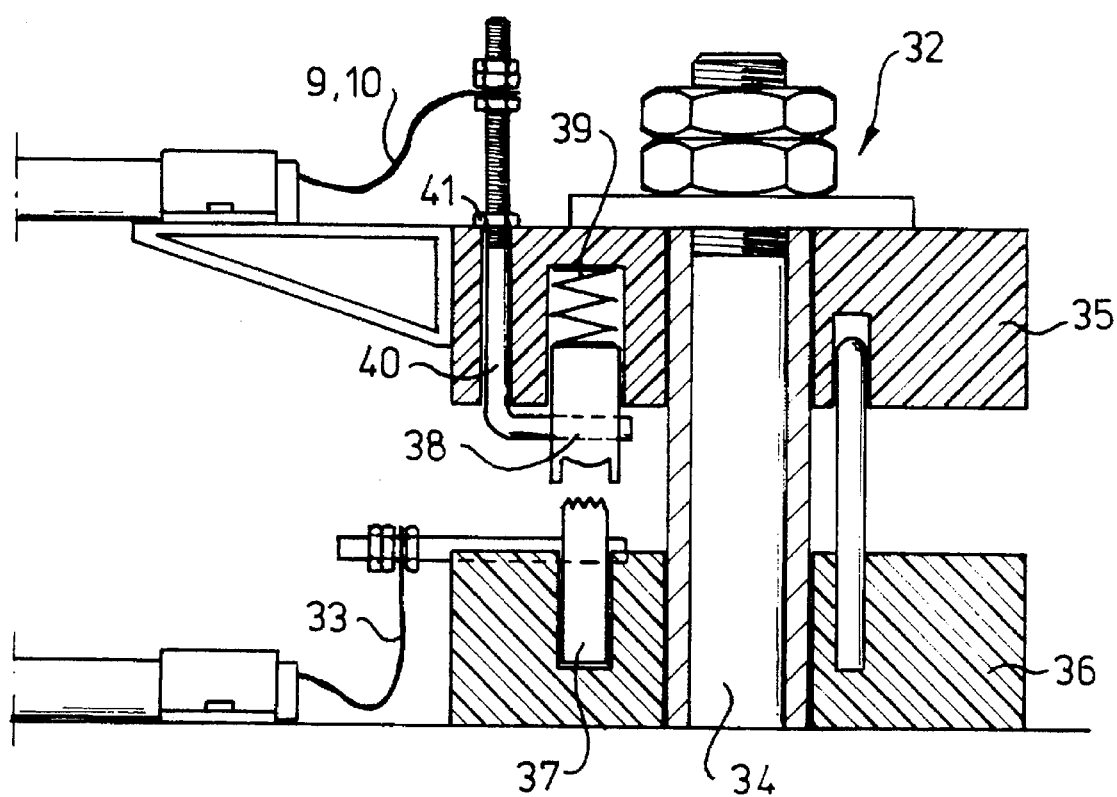
FIG. 7 shows an electrode connection.

FIG. 7 shows the connection device 32 on a larger scale. Said device comprises a bolt 34, around which two insulating plates 35, 36 are fitted. A connection contact 37 is incorporated in the lower insulating plate 36 and a slidable connection contact 38, which is pre-tensioned by spring 39, is incorporated in the upper insulating plate 35. The extent to which connection contact 38 protrudes is determined by the screw thread end 40 and the nut 41 fitted thereon. On turning the nut 41 the upper connection contact 38 moves towards, or away from, the lower connection contact 37. In this way the connection can be made, or broken.

During normal operation of the beam, the nut 41 is unscrewed to such an extent that the upper contact 38 is kept under spring tension in contact with the lower contact 37. For carrying out maintenance work, the nut 41 is screwed down until the contact 38 comes away from contact 37.

FIG. 8 shows a positive electrode, which comprises a central, electrically conducting core 42, to which electrode pieces 43 are electrically attached. The electrical connection between the electrode pieces 43 and the core 42 is ensured by means of electrically conducting wipes 44, which are fixed to the electrode pieces 43 by means of a connecting bolt 45.

Said core contains not only electrically conducting wipes but also a tension cable, which absorbs the tensile forces from the electrode.

A rubber sleeve 46 is fitted between the electrically conducting pieces 43, the outer circumference of said sleeve being identical to that of the electrode pieces 43 in the vicinity of the latter. In the intervening region the rubber sleeve 46 is constricted in order to prevent catching and to improve electrical conduction as the electrode is dragged along. The electrode pieces 43 are also provided with supplementary anchoring in the rubber sleeve 46 by means of stabiliser pins 47.

The negative electrode 10 has electrode pieces 48 which have a fairly long longitudinal dimension. Said electrode pieces 48 are connected to the central electrically conducting cope 42 in the same way, by means of connecting bolt 45 and cable 44.

In the alternative embodiment shown in FIGS. 10 and 11, the electrodes have a rectangular cross-section. The electrode pieces are indicated by 60. They are anchored in the flexible rubber material 62 of the electrodes by means of anchors 61.

The electrical connections for the electrodes are indicated by 63.

The electrodes ere attached to the cords 64 of a coarse-mesh fishing net. Nylon cords 65 are used for this purpose and clamp the cords 64 of the fishing net to the top of the electrodes. To this end the cords 64 are laid in recesses 66 on the top of the electrodes, whilst the nylon cords are accommodated in a recess 67, which extends over part of the sides and over the top of the electrodes. The nylon cord 65 also extends through a hole 68 in the rubber material of the electrodes.

A positive electrode is shown. Electrode pieces which are of greater width then that shown in FIG. 10 are used for a negative electrode.

I claim:

1. In a fishing gear for electric fishing, comprising an elongate beam and a net which is connected to the beam along a longitudinal back side thereof as seen in the direction of drag, said beam being at least as long as the maximum width of said net, said beam supporting electrodes over which a potential difference can be generated, as well as a power source and a pulse generator; the improvement wherein the power source and the pulse generator are housed in watertight chamber means inside the beam and the electrodes extend from within said chamber means.

2. Fishing gear according to claim 1, wherein the pulse generator is housed in a portion of said chamber means which for cooling purposes is adjacent a beam portion that is flushed with water.

3. Fishing gear according to claim 2, wherein said beam portion includes channels extending through the beam in the direction the beam is dragged and transverse to its longitudinal direction, which channels delimit at least said portion of said chamber means for the pulse generator.

4. Fishing gear according to claim 1, wherein the chamber means in the beam is closed by means of a lid.

5. Fishing gear according to claim 1, wherein the beam is rounded on a side which is foremost in the direction of drag and has passages for the electrodes at a back of the beam.

6. Fishing gear according to claim 1, the net is a trawl-net and the electrodes are attached at ends, distal to the beam, to a bottom edge of said trawl-net.

7. Fishing gear according to claim 1, wherein each electrode comprises a core of electrically conducting material, to which core metal electrode pieces are electrically connected with regular spacings between said pieces, and the core between the electrode pieces is insulated.

8. Fishing gear according to claim 7, wherein a rubber sleeve extends between the electrode pieces.

9. Fishing gear according to claim 1, wherein the beam is provided at both ends with shoes having an upwards-sloping front in the direction in which the beam is dragged.

10. Fishing gear according to claim 9, wherein the shoes are provided with at least one of wheels, rolling equipment and sliding equipment.

11. Fishing gear according to claim 9, wherein the shoes are provided with compartments which can individually be filled with water for altering the buoyancy of the gear.

* * * * *